(12) United States Patent
Schoenweger

(10) Patent No.: US 7,523,837 B2
(45) Date of Patent: Apr. 28, 2009

(54) INSTALLATION DEVICE FOR PLUMBING ELEMENTS

(75) Inventor: Alois Schoenweger, Schiltach (DE)

(73) Assignee: Hansgrohe AG, Schiltach (DE)

( * ) Notice: Subject to any disclaimer, the term of this patent is extended or adjusted under 35 U.S.C. 154(b) by 136 days.

(21) Appl. No.: 10/620,123

(22) Filed: Jul. 15, 2003

(65) Prior Publication Data

US 2004/0050423 A1    Mar. 18, 2004

(30) Foreign Application Priority Data

Jul. 18, 2002    (DE) ................. 102 33 858

(51) Int. Cl.
 *H02G 3/08*    (2006.01)
(52) U.S. Cl. .................... 220/3.5; 220/3.7; 137/360
(58) Field of Classification Search ............. 220/3.3, 220/3.5–3.9, 3.92, 3.94, 4.03, 629, 630, 669, 220/672; 137/360, 350, 359; 312/229, 242; 285/4, 64, 423; 174/486
See application file for complete search history.

(56) References Cited

U.S. PATENT DOCUMENTS

| 15,504 | A | * | 8/1856 | Wood ............... 5/617 |
| 754,414 | A | * | 3/1904 | Bossert ............ 220/3.7 |
| 2,143,517 | A | * | 1/1939 | Huff ............... 220/3.5 |
| 4,046,279 | A | * | 9/1977 | Rosler ............. 220/8 |
| 4,053,082 | A | * | 10/1977 | Ullman ............ 220/3.6 |
| 4,410,004 | A | * | 10/1983 | Kifer et al. ........ 137/360 |
| 4,989,633 | A | | 2/1991 | Humpert et al. |
| 5,050,632 | A | * | 9/1991 | Means, Jr. ......... 137/360 |
| 5,326,060 | A | * | 7/1994 | Chubb et al. ....... 248/231.9 |
| 5,368,065 | A | | 11/1994 | Humpert et al. |
| 5,466,886 | A | * | 11/1995 | Lengyel et al. ..... 174/487 |
| 5,653,254 | A | * | 8/1997 | Condon et al. ...... 137/360 |
| 5,934,032 | A | | 8/1999 | Oberdorfer |
| 6,129,109 | A | * | 10/2000 | Humber ........... 137/360 |

FOREIGN PATENT DOCUMENTS

| DE | 32 37 418 | 4/1984 |
| DE | 32 37 419 | 4/1984 |
| DE | 33 10 138 | 4/1984 |
| EP | 0 844 340 | 5/1998 |

OTHER PUBLICATIONS

European Search Report.

* cited by examiner

*Primary Examiner*—Anthony D Stashick
*Assistant Examiner*—Harry A Grosso
(74) *Attorney, Agent, or Firm*—Duane Morris LLP

(57) ABSTRACT

A two-piece, flush-mounting box designed for installing plumbing elements consists of the flush-mounting box itself and a flange that may be fastened to the side walls of the flush-mounting box at a certain distance from its front. That distance is preset prior to installation in order that, as the case may be, removal of its protruding portion will be unnecessary or the front surface of the flange will be flush with the front or rear surface of the wall when it has been installed.

11 Claims, 4 Drawing Sheets

INSTALLATION DEVICE FOR PLUMBING ELEMENTS

Figure 1:
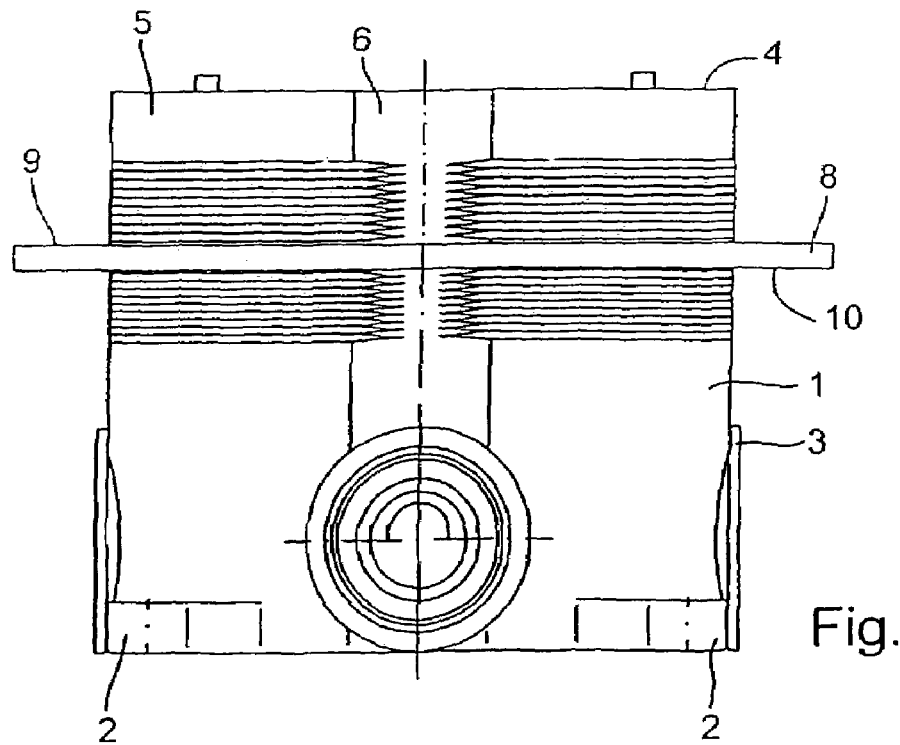

The invention is based on a flush-mounting installation box for plumbing fixtures. Such flush-mounting boxes are known and used for accommodating plumbing fixtures or other plumbing components in an opening in a wall, a recess in a wall, or similar. Such flush-mounting boxes have proven their worth, in particular, in the case of partitioning walls and double-walled systems.

Flush-mounting boxes, which are usually fabricated from plastic, are inserted into the recess or opening. They are dimensioned such that their front edges will protrude beyond the outer surfaces of the walls in which they are installed. However, they may be too short in some cases. Once tiles have been laid, the installer either cuts off the protruding portion with a knife or some other cutting tool or attaches an extension to the box. The front edge of the box will then be flush with the front surface of the wall, provided that a conscientious installer does the job. Obtaining neatly cut edges takes quite a while.

In the case of a known flush-mounting box for plumbing fixtures (cf. EP 0844340), a flange that may be repositioned is attached to the box. Once the box has been final-installed, the flange is to be repositioned such that it will be aligned on the gap between two housing elements. This flange has no holding function. The front side of the box must be cut off after tiles have been laid.

The problem addressed by the invention is creating a flush-mounting box of that type that will provide benefits in terms of the speed and accuracy with which it may be installed, particularly in the case of prefabricated houses, even though its design has been stringently cost-engineered.

The invention solves that problem by proposing an installation device having those features stated in claim 1. Other embodiments of the invention are covered by the dependent claims.

Known flush-mounting boxes are usually mounted on their base. However, there also are flush-mounting boxes that have a rigid, solid flange formed on them. Such boxes also suffer from the problem that their protruding edges must be subsequently cut off.

Instead of that sort of flange, the flange on the installation device according to the invention is a part that may be fastened to the flush-mounting box at various distances from the opening in its front, which will for example, allow setting the distance between the flange and the front surface of its housing to suit the installation conditions to apply later, or the wall depth, when erecting prefabricated houses or more cost-effectively erecting normal houses. If boxes are to be laid out side by side, this may be accomplished prior to installation in order that conscientious installers will no longer need to be present at the installation site. The time spent at the installation site will be reduced.

The flange may be made up of separate parts that may be fastened to the flush-mounting box. However, a particularly reasonable choice would be to use a flange in the form of a solid ring that fully encircles the flush-mounting box.

In particular, under an elaboration on the invention, it may be provided that the flange may be fastened to the outer surfaces of the side walls of the flush-mounting box.

The joint between the flange and the flush-mounting box may be generated in various ways, for example, by means of fasteners, clips, or similar. However, a particularly reasonable choice would be to use a flange that could be fastened directly to the flush-mounting box, without need for other aids, in order that the installation device would need to consist of just two components, namely, the flush-mounting box and the flange that may be fastened thereto.

That joint may, for example, be a screw joint, which would require that the flush-mounting box have a right-circular cylindrical shape in order that the gap between the inner circumference of the flange and the outer surface of the box may be kept narrow.

In order to implement that screw joint, it may be provided that the outer surface of the side wall of the flush-mounting box and, if desired, the inner circumference of the flange as well, have a thread. That thread might be a very fine thread, which would be easy to fabricate if the flush-mounting box were fabricated from plastic.

In order that the flange will not have to be screwed on a long way, in accordance with the invention, it may be provided that the thread is interrupted down to its root at at least one location on its circumference in order that the ring may be initially slipped onto the flush-mounting box at the location of the interruption until it reaches the right depth, and then screwed on the rest of the way.

Another means for joining the flange to the flush-mounting box in the desired manner would be to provide one or more bayonet joints between the flush-mounting box and the flange. Here, once again, by choosing a suitable design, it may be provided that the ring may be slipped onto the box at a certain location until it reaches about the right depth, and then rotated to the latched position of the bayonet joint(s).

Yet another means for joining the flange to the flush-mounting box might be providing the flange with means for engaging the mounting eyes on the flush-mounting box. Such mounting eyes are used for, for example, bolting the flush-mounting box to the base of a recess. Using these mounting eyes, which will be present anyhow, has the advantage that it allows installing flush-mounting boxes in various ways.

These types of mountings will also be available if the flush-mounting box has a cross-section other than that of a right-circular cylinder.

Under a further elaboration on the invention, it may be provided that the flange is fastened to the front of the flush-mounting box.

An additional latching element, for example, some sort of wedge, may be provided in order to provide for a latching of a screw joint, or some other type of joint that may, in principle, be altered, once the flange is at the desired position.

In addition to fastening the flush-mounting box to the outer wall of a double wall, the flange may also be used for accommodating a seal. The flange may abut against the front or rear surface of the wall, depending upon the particular application involved.

Figure 2:
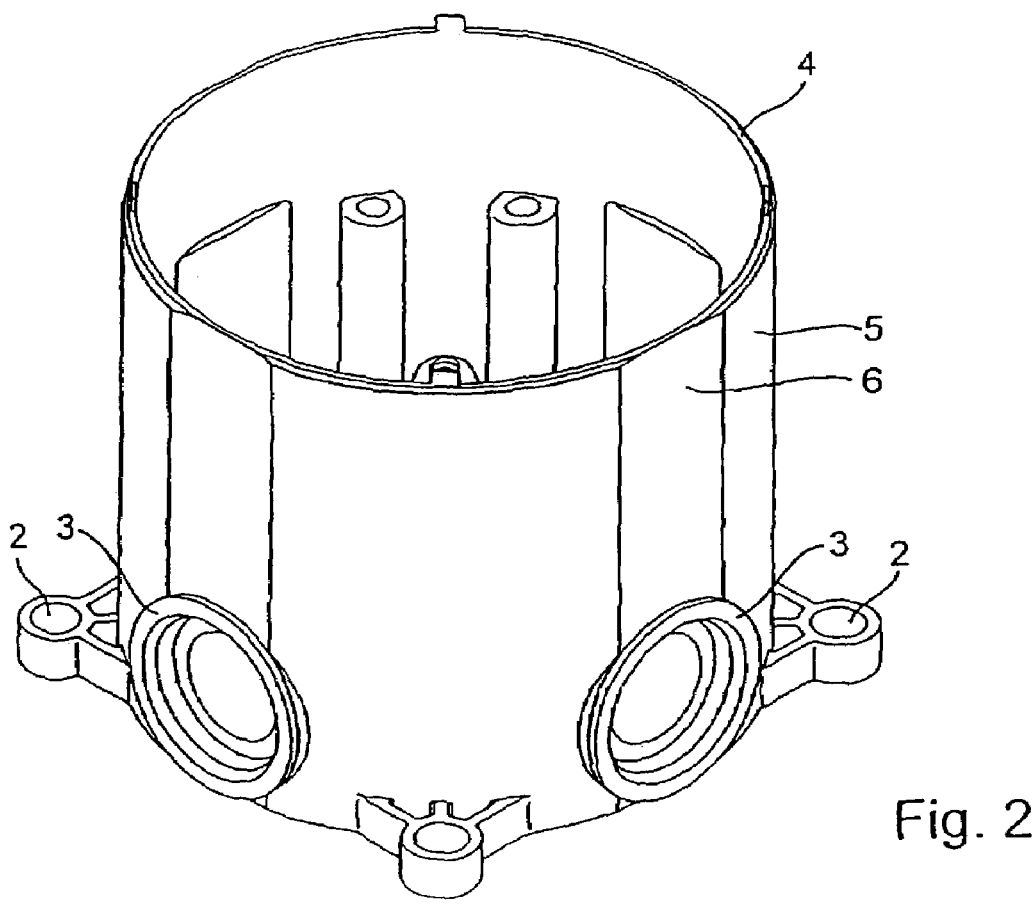
Figure 3:
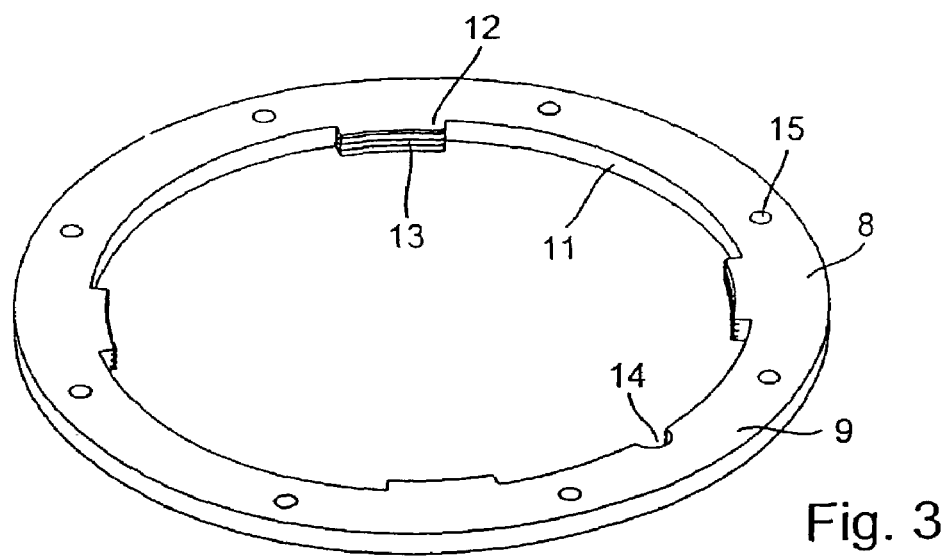
Figure 4:
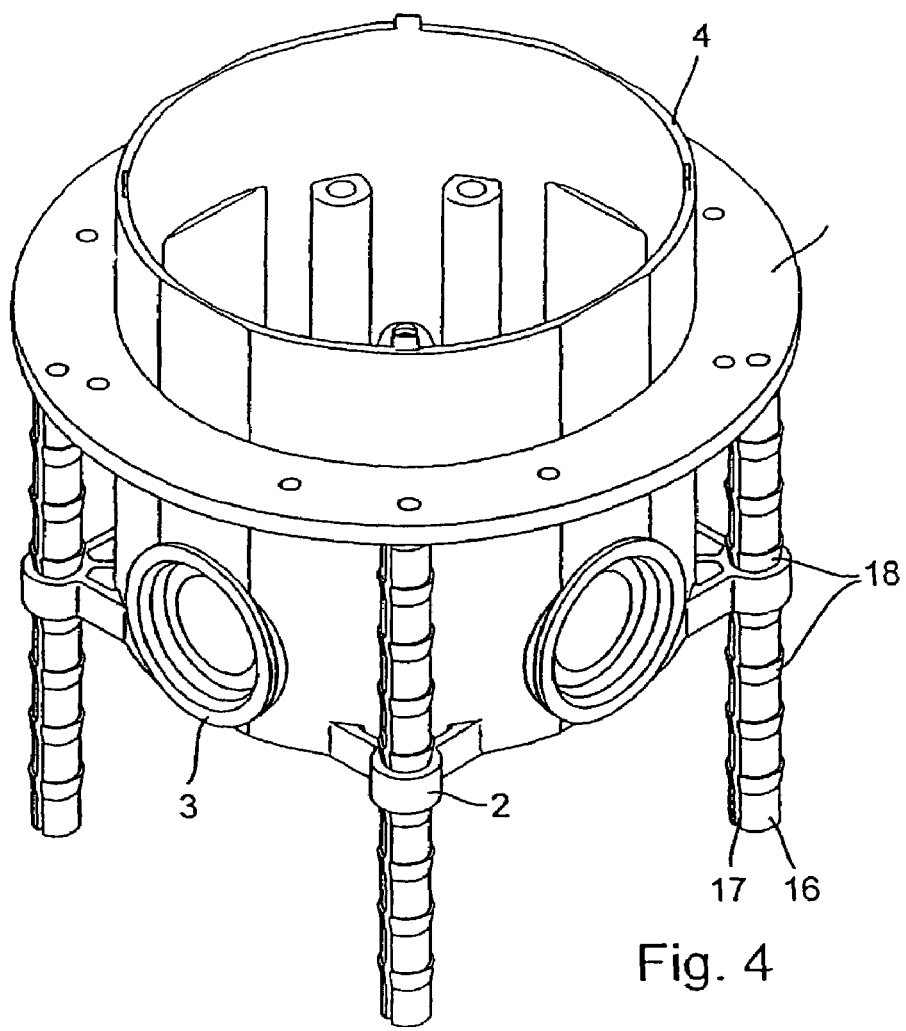
Figure 5:
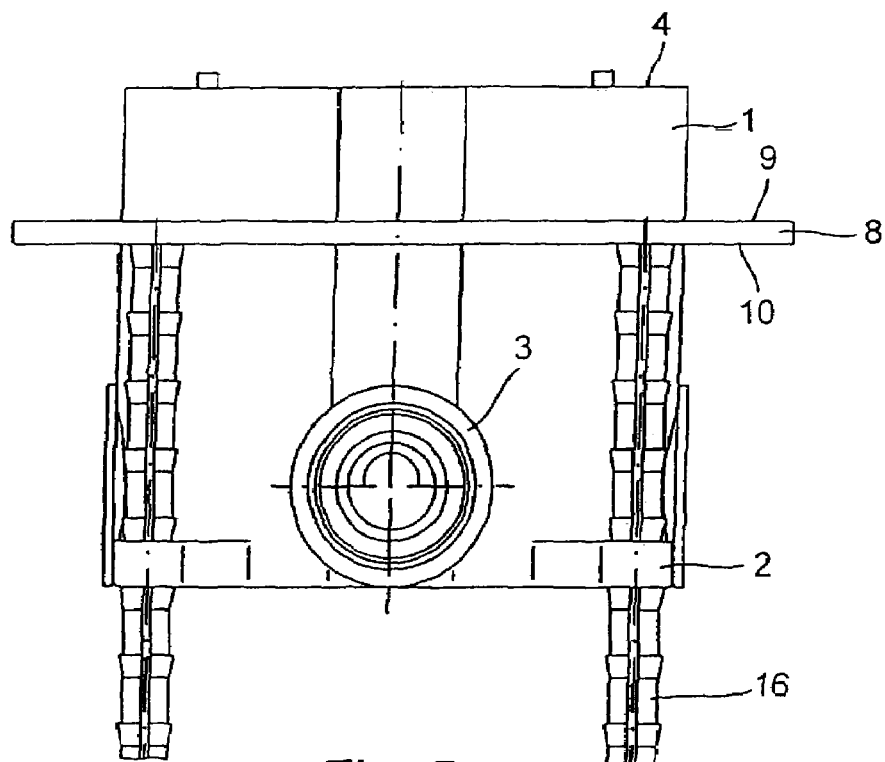
Figure 6:
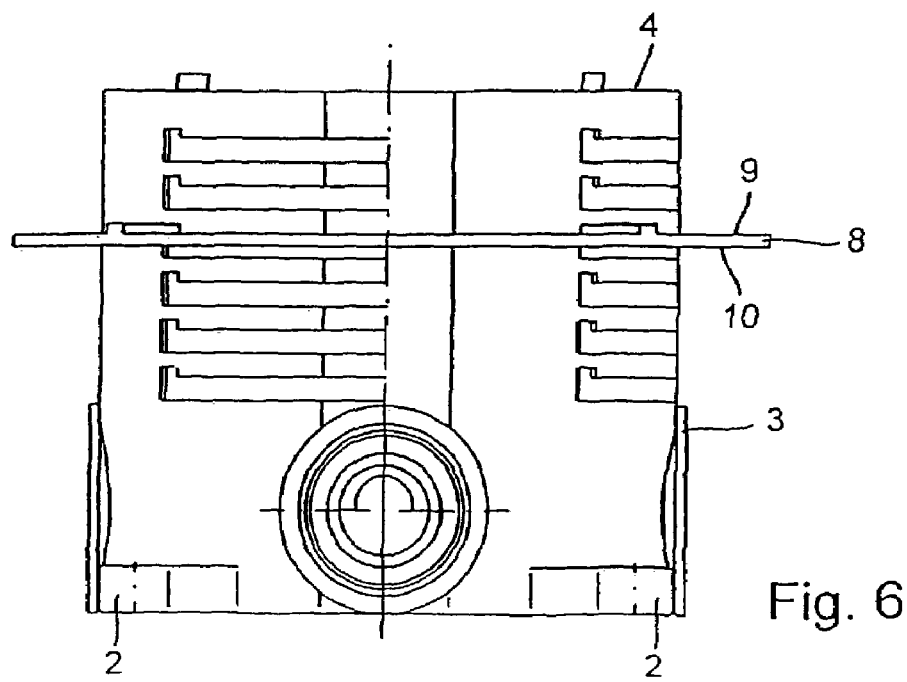
Figure 7:
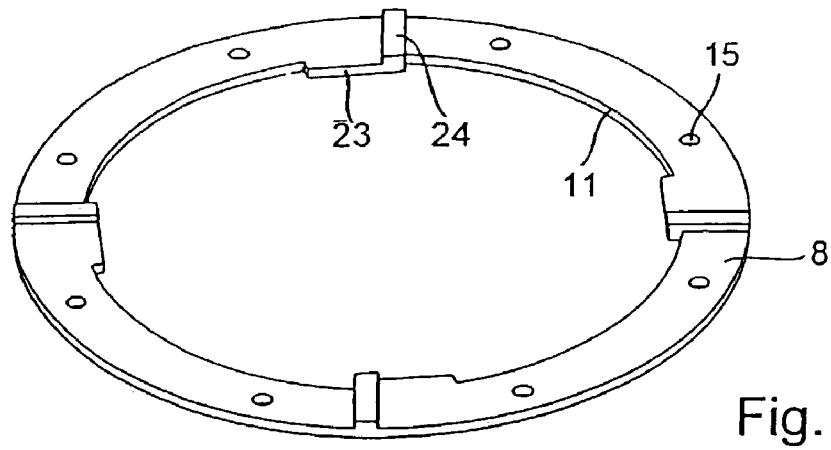
Figure 8:
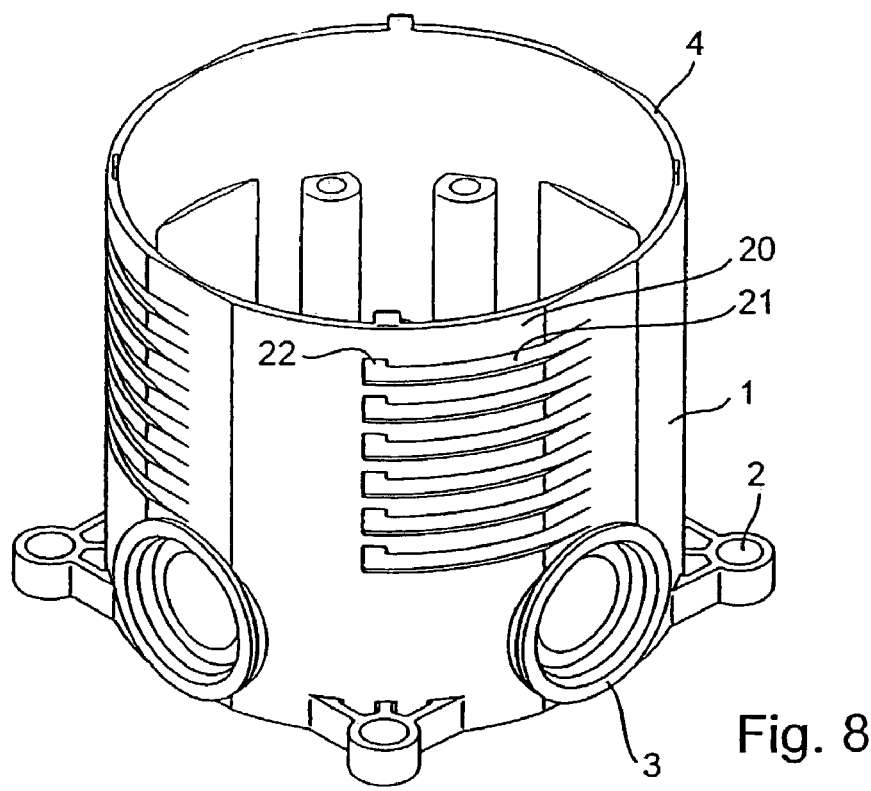
Figure 9:
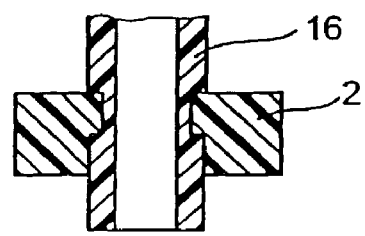

Other features, details, and benefits of the invention will be evident from the claims and the abstract, whose wordings are herewith made part of this description by way of reference thereto, the following descriptions of preferred embodiments of the invention, and from the figures, where the figures depict:

FIG. 1 a side view of a first embodiment of a flush-mounting box, on which a flange has already been fastened;

FIG. 2 a perspective view of the flush-mounting box shown in FIG. 1 with the flange removed;

FIG. 3 a perspective view of the flange used on the embodiment shown in FIG. 1;

FIG. 4 a perspective view of a second embodiment;

FIG. 5 a side view of the embodiment shown in FIG. 4;

FIG. 6 a view, corresponding to that FIG. 1, of a third embodiment;

FIG. 7 a perspective view of the flange used on the embodiment shown in FIG. 6;

FIG. 8 a perspective view of the flush-mounting box used on the embodiment shown in FIG. 6;

FIG. 9 a detailed, sectioned view of a mounting eye.

FIG. 1 depicts a side view of a plastic flush-mounting box 1 having a right-circular cylindrical cross-section that is only marginally interrupted by additional components. The lower end of the flush-mounting box 1, i.e., that end that appears at the bottom of FIG. 1, is closed by a base such that the flush-mounting box has a pot-like shape. The flush-mounting box is to be oriented such that its open end, i.e., upper end in FIG. 1, forms the front of the box when it is mounted on a wall.

Protruding eyes 2 that may be used for bolting the flush-mounting box 1 directly on a wall, or at a distance from a wall, are formed on the outer surface of the wall of the flush-mounting box, in the vicinity of its base. A total of four fittings 3 that form radially disposed apertures in its wall provide access to the interior of the flush-mounting box 1. The lines are fed in through these apertures 3.

Various facilities for installing plumbing fixtures that are to be accommodated within the flush-mounting box 1 are provided in its interior (cf. FIG. 2). The mounting eyes 2 are arranged midway between the apertures of the fittings 3 for the lines.

The flush-mounting box has a thread 5 on the outer surface of its side wall that extends rearward from a smooth area having a depth of, for example, 3 cm, measured from the edge 4 of its open front. The length of this threaded zone roughly equals half the height of the flush-mounting box. The thread 5 is interrupted at several locations along its circumference, where these breaks 6 therein run axially. These breaks 6 are configured such that they yield zones whose distances from the longitudinal axis of the flush-mounting box 1 are less than, or equal to, the distance between the root of the thread 5 from the longitudinal axis of the flush-mounting box, which means that no thread will be present at the locations of those zones, while the remainder of the thread will lie on a helix.

The locations at which the thread is interrupted coincide with those locations on the fittings 3.

A ring 7 that thus forms a flange 8 is screwed onto the thread 5. The flange 8 has a planar front surface 9 and a rear surface 10 that is also planar and runs parallel thereto. Screwing the ring 7 onto the thread 5 on the flush-mounting box will allow adjusting the distance between the front surface 9 of the flange 8 and the plane of the edge 4 of the front of the flush-mounting box 1.

The associated ring that forms the flange 8 is shown in a perspective view in FIG. 3. As may be seen from FIG. 3, the flange 8 is annular and has a total of four protrusions 12 on its inner circumference 11, which has an internal thread 13. The tangential lengths of those protrusions 12 equal the tangential lengths of the unthreaded locations 6 on the outer surface of the flush-mounting box. The ring may be initially oriented such that the protrusions 12 are aligned on the unthreaded locations 6. The ring may then be translated parallel to its plane and brought to the position where it is to be fastened in place. A slight rotation of the ring will cause the threads on the protrusions 12 to engage the thread on the flush-mounting box 1 in order that the ring may then be screwed on further. The position of the ring may be very rapidly altered in this manner, in spite of the fine thread.

In order that the flange may be latched in place once it has reached its final position, the ring 7 has a semicircular notch 14 on its inner circumference. A wedge that will prevent any further rotation of the flange 8, and thus any change in the distance between the edge 4 and the flange 8, may be driven into this notch.

The ring 7 forming the flange 8 has through-holes 15 that may be used for bolting the flange 8 of the flush-mounting box 1 onto a drywall or the front or rear surface of the outer wall of a double wall.

FIG. 4 depicts a second embodiment, where, in the view shown in FIG. 4, the flush-mounting box is depicted with the flange 8 in place. The flange 8 is, once again, configured in the form of a ring, as in the case of the embodiment depicted in FIGS. 1-3, where, however, in this case, it has no threaded protrusions on its inner circumference 11, and has a smooth-surfaced inner circumference. Four extensions 16 resembling wall inserts are situated on the rear surface 10 of the flange 8, i.e. that surface that faces away from the edge 4 of the open front of the flush-mounting box 1. These extensions 16 are longitudinally split, i.e., have a longitudinal slot 17 extending over their full length. The outer surfaces of these extensions 16 also have wedge-shaped protrusions 18 that ease their insertion into the mounting eyes 2, but constrain, or prevent, their being withdrawn therefrom. When these extensions are inserted therein, these wedge-shaped surfaces 18 provide that the extensions will be compressed, which will narrow down the slot 17, until such time as the circular extension 16 has passed through the eye 2 and emerged on its far side and is able to expand to its unstressed diameter. In the case of this embodiment, the outer surface of the flush-mounting box 1 is unthreaded. This embodiment is also not confined to flush-mounting boxes having circular cross-sections, since the flush-mounting boxes involved here no longer need to be rotated about their longitudinal axes. This embodiment also provides means for securing the flange 8 against rotation. In the case of the particular embodiment depicted in FIGS. 4 and 5, the protruding portions of the extensions 16 may be cut off prior to installation.

FIG. 5 depicts the associated side view, from which it may be seen that the extensions 16 and their slots 17 extend well beyond the base of the flush-mounting box.

The figures that follow, FIGS. 6, 7 and 8, depict another embodiment. In the case of this embodiment, tangential protrusions 20 that protrude only slightly from the outer surface of the flush-mounting box, i.e., whose outer edges have radial distances from its longitudinal axis that differ only slightly from that of its outer surface, between which tangential grooves 21 will also be formed, are formed on its outer surface. Altogether, such protrusions are formed at four locations around the circumference of the flush-mounting box 1. Broadened sections 22 of the grooves that may be used for latching purposes are formed on their far ends, proceeding in the clockwise direction. Four protrusions 23 that roughly correspond to the protrusions 12 of the embodiment shown in FIG. 3 distributed around the 11 of the associated flange 8 (cf. FIG. 7) are formed on the inner circumference thereof. A thicker section in the form of a radial rib 24 is formed on one end of these protrusions 23. The flange 8 shown in FIG. 7 is initially oriented such that the projections 23 are aligned on the gaps between the protrusions 20. The flange is then slid onto the flush-mounting box 1, while keeping it parallel to its original orientation, until it has reached the correct orientation. The flange is then rotated clockwise, which will cause the projections 23 to engage the grooves 21, until the ribs 24 engage the broadened sections 22. The radial ribs 24 on the upper surface 9 of the flange 8 may also be used for easing rotation of the flange, since users may utilize these ribs to prevent their hands from slipping when manually rotating the flange.

The device for installing plumbing elements, in particular, plumbing fixtures, proposed by the invention is used as follows: The distance between the rear surface of the drywall and the outer surface of the tiles on the outer surface thereof is either read off the drawings or measured on site. The flange 8 is then joined to the flush-mounting box such that the distance between the edge 4 of the flush-mounting box and the front surface 9 of the flange 8 agrees therewith. This procedure applies in cases where the front surface 9 of the flange 8 is to abut against the rear surface of such a drywall.

A similar procedure applies when the flange 8 is to abut against the other side of the drywall, i.e., when its rear surface is to abut against the outer surface of the drywall. The invention allows setting the distance by which the flush-mounting box protrudes from the wall prior to installation, which reduces the time and effort required at the installation site.

FIG. 9 depicts a detailed, sectioned view of an eye 2 into which an extension 16 resembling a wall insert has been inserted. The extension 16 resembling a wall insert has a circumferential groove running around its outer surface that may be used for providing that the extension 16 will snap into place in the eye 2 and thus be latched into position therein.

Since the extension 16 is hollow, it may also be secured in the position shown by screwing a sheet-metal screw into it from the rear, i.e., from below in FIG. 9. This screw is self-tapping and will cut its own thread in the plastic material.

The portion of the extension 16 that extends beyond the far side of the eye 2 may be cut off using a knife or a saw.

In the views shown in FIGS. 4 and 5, the extensions on the rear surface of the flange 8 have been inserted into those eyes 2 that might normally also have been used for installing the flush-mounting box. Incorporating additional eyes on the flush-mounting box that would be used exclusively for the purpose of fastening these extensions in place would also feasible and covered by the invention. The other eyes 2 would then remain available for installing the flush-mounting box itself and thus retain their former functions.

Another approach to configuring the installation device proposed by the invention would be to provide that bolts that may be used to bolt the entire box onto a supporting structure could be inserted through the hollow extensions 16 from the front surface of the flange 8.

What is claimed is:

1. An installation device for plumbing elements, comprising:
    a flush-mounting box that has an open front having an edge, the flush-mounting box having side walls extending from the edge to a base, wherein protruding eyes extend radially outwardly on an outer surface of the side walls adjacent to the base for affixing the flush-mounting box at the base, the mounting box further comprising fittings for installing plumbing elements within the flush-mounting box, said fittings including apertures in the side walls,
    a flange on an outside of the box,
    plural means on the box for fastening the flange to the box at a selectably variable distance rearwardly back from the edge at the open front,
    wherein the plural means on the box for fastening the flange to the box comprise a plurality of grooves on an outside of the side walls of the box, spaced back at different distances from the edge of the open front of the box, and
    the flange is fastenable on the outside of the box by inward protrusions on the flange that engage with a selected one of the grooves for selectably setting a distance of the flange back from the edge.

2. An installation device according to claim 1, wherein the flange comprises a solid ring.

3. An installation device according to claim 1, wherein the flange is fastened directly to the flush-mounting box.

4. An installation device according to claim 1, wherein a joint between the flush-mounting box and the flange comprises at least one bayonet joint.

5. An installation device according to claim 1, wherein the flange is fastenable to the flush-mounting box from the open front of the flush-mounting box.

6. An installation device according to claim 1, wherein the flange is latchable into position on the flush-mounting box.

7. An installation device for plumbing elements, comprising:
    a flush-mounting box that has an open front having an edge, the flush-mounting box having side walls extending from the edge to a base, wherein protruding eyes extend radially outwardly on an outer surface of the side walls adjacent to the base for affixing the flush-mounting box at the base, the mounting box further comprising fittings for installing plumbing elements within the flush-mounting box, said fittings including apertures in the side walls,
    a flange on an outside of the box;
    plural means on the box for fastening the flange to the box at a selectably variable distance back from the edge;
    a plurality of structures spaced back from edge at the open front and on outer surfaces of the side walls, wherein the flange is set to said distance by fastening to a selected one of the structures; and,
    wherein the outer surfaces of the side walls and an inner surface of the flange engage at one of plural ribs spaced back from the edge and having 0° pitch angles.

8. An installation device according to claim 7, wherein the ribs are interrupted at at least one location on their circumference down to at least a root of the ribs.

9. An installation device for plumbing elements, comprising:
    a flush-mounting box that has an open front having an edge, the flush-mounting box having side walls extending from the edge to a base, wherein protruding eyes extend radially outwardly on an outer surface of the side walls adjacent to the base for affixing the flush-mounting box at the base, the mounting box further comprising fittings for installing plumbing elements within the flush-mounting box, said fittings including apertures in the side walls,
    a flange on an outside of the box;
    plural means on the box for fastening the flange to the box at a selectably variable distance back from the edge; and,
    wherein the means on the box comprise ribs that are interrupted at at least one location on their circumference down to at least the root of the ribs.

10. An installation device for plumbing elements, comprising:
    a flush-mounting box that has an open front having an edge, the flush-mounting box having side walls extending from the edge to a base, wherein protruding eyes extend from the side walls adjacent to the base for affixing the flush-mounting box at the base, the mounting box having fittings for installing plumbing elements within the flush-mounting box, said fittings including apertures in the side walls,
    a flange on an outside of the box,
    plural means on the box for fastening the flange to the box at a selectably variable distance back from the edge,
    wherein the plural means on the box for fastening the flange to the box comprise a plurality of grooves on an outside of the side walls of the box, spaced back at different distances from the edge of the open front of the box;

the flange is fastenable on the outside of the box by inward protrusions on the flange that engage with a selected one of the grooves for selectably setting a distance of the flange back from the edge; and, wherein the grooves are located at tangential surfaces protruding radially on the outside of the box, between which surfaces are gaps along which the inward protrusions of the flange are movable back from the edge, wherein the inward protrusions of the flange are engaged in a selected one of the grooves by rotation of the flange relative to the box.

11. The installation device of claim 10, wherein the grooves end in broadened sections that receive the protrusions of the flanges.

* * * * *